(12) United States Patent
Honda

(10) Patent No.: US 6,928,424 B2
(45) Date of Patent: Aug. 9, 2005

(54) CONTENTS RETRIEVAL SYSTEM AND CONTENTS RETRIEVAL PROGRAM STORAGE MEDIUM

(75) Inventor: Hachiro Honda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 307 days.

(21) Appl. No.: 09/897,604

(22) Filed: Jul. 3, 2001

(65) Prior Publication Data

US 2002/0059173 A1 May 16, 2002

(30) Foreign Application Priority Data

Jul. 4, 2000 (JP) ........................................ 2000-202101

(51) Int. Cl.⁷ ............................................. G06F 17/30
(52) U.S. Cl. ................................ 707/1; 707/9; 707/10; 709/217
(58) Field of Search ................... 707/1–10, 100–104.1, 707/200–206; 709/211–212, 217, 219, 225, 229

(56) References Cited

U.S. PATENT DOCUMENTS 5,694,595 A * 12/1997 Jacobs et al. .................. 707/9
6,275,825 B1 * 8/2001 Kobayashi et al. ............ 707/9

FOREIGN PATENT DOCUMENTS

JP    11-15766    1/1999    ........... G06F/13/00

OTHER PUBLICATIONS

Patent Abstract of Japan, 11-015766, Jan. 22, 1999.

* cited by examiner

Primary Examiner—Shahid Alam
Assistant Examiner—Jean Bolte Fleurantin
(74) Attorney, Agent, or Firm—Sughrue Mion, PLLC

(57) ABSTRACT

A contents retrieval system has: retrieval request receiving means for receiving a retrieval request of contents on a communication network from a user accessing through the communication network, and setting up processing conditions for retrieval processing in accordance with the retrieval request, and further issuing a reservation number of the retrieval processing and informing the user of the reservation number, and in addition applying the reservation number to the processing conditions and registering the same with a predetermined retrieval management table; contents retrieval means for retrieving the contents on the communication network in accordance with the processing conditions registered with said retrieval management table and storing the retrieval result, together with the reservation number, in a predetermined retrieval result storage file; and retrieval result providing means for retrieving a retrieval result associated with the reservation number from among the retrieval results stored in said retrieval result storage file, when an inquiry concerning the retrieval result is made from a user based on the reservation number, and providing the retrieval result for the user.

15 Claims, 15 Drawing Sheets

CONTENTS RETRIEVAL SYSTEM AND CONTENTS RETRIEVAL PROGRAM STORAGE MEDIUM

BACKGROUND OF THE INVENTION

1. Field of the Invention

The present invention relates to a contents retrieval system for performing a retrieval of contents on a communication network, and a contents retrieval program storage medium.

2. Description of the Related Art

As technology of a communication network advances, user needs for retrieving contents on the communication network is being increased. In the field of the contents retrieval system, there is widely provided a retrieval service in which a server at a client side, who receives a retrieval request from a user, retrieves contents on the communication network and provides a retrieval result for the user.

As such a type of retrieval service system, for example, Japanese Patent Laid Open Gazette Hei. 11-15766 discloses an information exchange apparatus comprising a server for providing an application service such as various types of application software, a client receiving an offer of the application service from the server, communication networks each for connecting the server with the client, and communication network connecting means for mutually connecting the communication networks to each other.

However, according to the former retrieval service system, in the event that a client requests of a server a retrieval service, there is a need for the client to maintain a connection state with the server until the client receives the retrieval result from the server.

For example, in the event that a content of the retrieval is contents of image data on a communication network, it often happens that a considerable long time is required for the retrieval. Maintaining a connection state of the communication network for such a long time makes the cost for communication run up, and brings about the possibility that another communication is hindered because a communication line between the client and the server is blocked.

SUMMARY OF THE INVENTION

In view of the foregoing, it is an object of the present invention to provide a contents retrieval system capable of performing in low cost a retrieval of contents even in case of a contents retrieval requiring a long time, and a contents retrieval program storage medium.

To achieve the above-mentioned object, the present invention provides a contents retrieval system comprising:

retrieval request receiving means for receiving a retrieval request of contents on a communication network from a user accessing through the communication network, and setting up processing conditions for retrieval processing in accordance with the retrieval request, and further issuing a reservation number of the retrieval processing and informing the user of the reservation number, and in addition applying the reservation number to the processing conditions and registering the same with a predetermined retrieval management table;

contents retrieval means for retrieving the contents on the communication network in accordance with the processing conditions registered with said retrieval management table and storing the retrieval result, together with the reservation number, in a predetermined retrieval result storage file; and retrieval result providing means for retrieving a retrieval result associated with the reservation number from among the retrieval results stored in said retrieval result storage file, when an inquiry concerning the retrieval result is made from a user based on the reservation number, and providing the retrieval result for the user.

In the contents retrieval system according to the present invention as mentioned above, it is preferable that said retrieval request receiving means sets up as to whether there is a need to display a retrieval result as one of the processing conditions in form of a thumb-nail image, so that the set up result is registered with said retrieval management table, and said contents retrieval means creates the thumb-nail image and stores the thumb-nail image in a predetermined image storage file in the event that the thumb-nail image is needed in accordance with the set up result as to whether there is a need to display the thumb-nail image registered with said retrieval management table.

In the contents retrieval system according to the present invention as mentioned above, it is also preferable that said retrieval request receiving means sets up as to whether there is a need to inform a user by an electronic mail of the fact that a retrieval result is obtained at the time point when the retrieval result as one of the processing conditions is obtained by said contents retrieval means, so that the set up result is registered with said retrieval management table, and said contents retrieval means informs the user by an electronic mail of the fact that the retrieval result is obtained in the event that the thumb-nail image is needed in accordance with the set up result as to whether there is a need to inform the user by the electronic mail registered with said retrieval management table.

To achieve the above-mentioned object, the present invention provides a contents retrieval program storage medium storing a contents retrieval program for forming a contents retrieval system on a computer system, said contents retrieval system comprising:

retrieval request receiving means for receiving a retrieval request of contents on a communication network from a user accessing through the communication network, and setting up processing conditions for retrieval processing in accordance with the retrieval request, and further issuing a reservation number of the retrieval processing and informing the user of the reservation number, and in addition applying the reservation number to the processing conditions and registering the same with a predetermined retrieval management table;

contents retrieval means for retrieving the contents on the communication network in accordance with the processing conditions registered with said retrieval management table and storing the retrieval result, together with the reservation number, in a predetermined retrieval result storage file; and retrieval result providing means for retrieving a retrieval result associated with the reservation number from among the retrieval results stored in said retrieval result storage file, when an inquiry concerning the retrieval result is made from a user based on the reservation number, and providing the retrieval result for the user.

DETAILED DESCRIPTION OF PREFERRED EMBODIMENTS

Embodiments of the present invention will be described with reference to the accompanying drawings.

Figure 1:
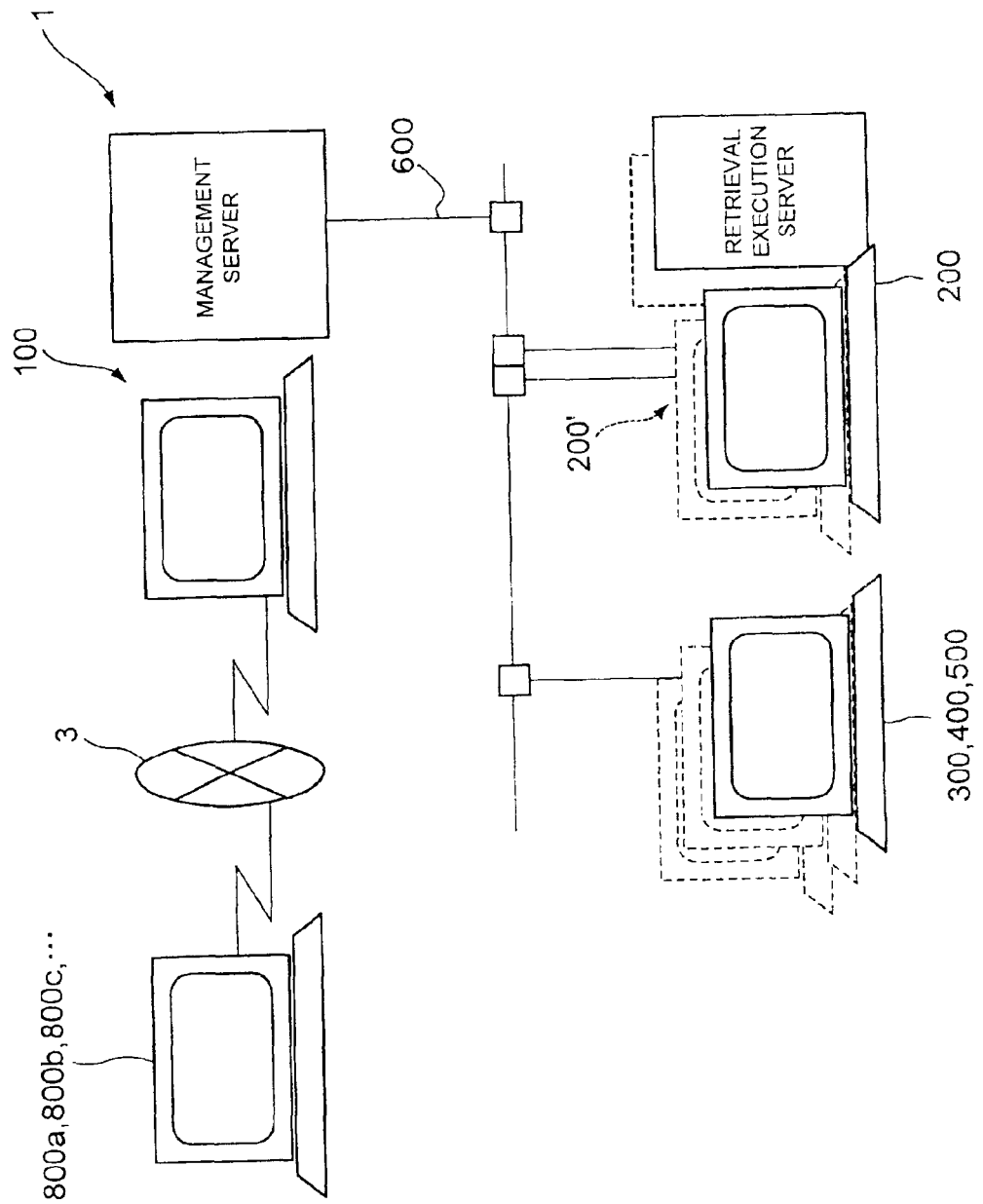
FIG. 1 is a schematic constitution view of a computer system to which an embodiment of a contents retrieval system of the present invention is applied.

FIG. 1 is a schematic constitution view of a computer system to which an embodiment of a contents retrieval system of the present invention is applied.

As shown in FIG. 1, a computer system 1 comprises: a first server machine 100 for performing a Web display and a management for retrieval processing, in which there is formed a contents retrieval system for performing the retrieval processing upon receipt of a retrieval request for contents on a communication network 3, for example, Internet from client machines 800a, 800b, 800c, . . . , which access through the communication network 3; a second server machine 200 for executing a retrieval, said second server machine 200 being connected to the first server machine 100 via a LAN (Local Area Network) 600; client machines 300, 400 and 500 for operating the server machines 100 and 200; and a large number of client machines 800a, 800b, 800c, . . . , which access the first server machine 100 via the communication network 3 to request a retrieval. Incidentally, the second server machine 200 is provided with a memory unit 200' having a large storage capacity for an image database specified in such a manner that contents particularly image contents in the present embodiment are stored.

According to the present embodiment, the computer system 1 comprises two server machines. However, it is not restricted to two server machines. It is acceptable that the server machines are of one or more than two. It is also acceptable that the memory unit 200' is replaced by a third server machine. With respect to the second server machine 200 for executing retrieval, it is not restricted to one server machine, and it is acceptable to provide a plurality of server machines for executing retrieval.

The client machines 800a, 800b, 800c, . . . imply not only a computer system of clients who request retrieval to the contents retrieval system, but also a computer system of a so-called Web site, which possesses contents to be retrieved by the contents retrieval system.

Figure 2:
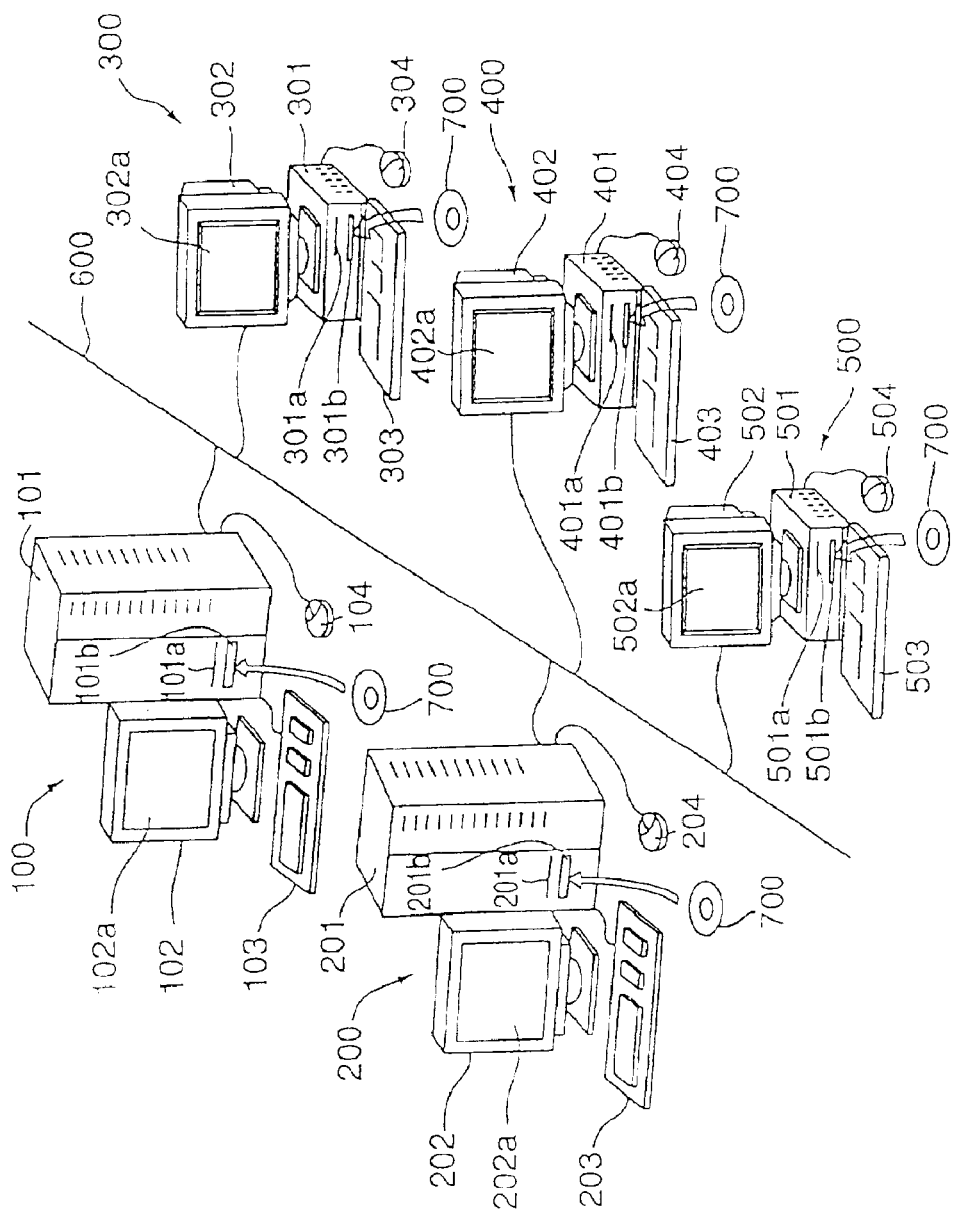
FIG. 2 is a view showing a part of a computer system in which an embodiment of a contents retrieval system of the present invention is constituted.

FIG. 2 is a view showing a part of a computer system in which an embodiment of a contents retrieval system of the present invention is constituted.

FIG. 2 exemplarily shows two server machines 100 and 200 on which a database is constructed, and the client machines 300, 400 and 500. The server machines 100 and 200, and the client machines 300, 400 and 500 are mutually connected via the LAN 600 to each other. Each of the server machines 100 and 200 is generally implemented as a high speed and large capacity of computer system such as a workstation. Each of the client machines 300, 400 and 500 are implemented as a relatively small type of computer system such as a personal computer or a workstation.

The server machines 100 and 200, and the client machines 300, 400 and 500 comprise, respectively: main frames 101, 201, 301, 401 and 501 each incorporating therein a CPU (central processing unit), a RAM (random access memory), a hard disk, a communication board, etc.; display units 102, 202, 302, 402 and 502 for displaying images and character strings on display screens 102a, 202a, 302a, 402a and 502a in accordance with instructions from the main frames 101, 201, 301, 401 and 501, respectively; keyboards 103, 203, 303, 403 and 503 for inputting instructions of users to the server machines 100 and 200, and the client machines 300, 400 and 500, respectively; and mice 104, 204, 304, 404 and 504 for inputting instructions according to icons or the like displayed on positions designated on the display screens 102a, 202a, 302a, 402a and 502a, respectively.

On each of the server machines 100 and 200, there is constructed a database storing information necessary for use of the contents retrieval system, so that users can access the databases on the server machines 100 and 200 from the client machines 300, 400 and 500 via the LAN 600.

The main frames 101 and 201 of the server machines have on an outside appearance basis floppy disk drives 101a and 201a onto which floppy disks (not illustrated) are loaded, and CD-ROM drives 101b and 201b onto which CD-ROMs 700 are loaded, respectively. Inside those main frames 101 and 201, there are also incorporated floppy disk drivers for driving the floppy disks loaded from the floppy disk drives 101a and 201a, and CD-ROM drivers for driving the CD-ROMs 700 loaded from the CD-ROM drives 101b and 201b.

Likewise, the main frames 301, 401 and 501 of the client machines have on an outside appearance basis floppy disk drives 301a, 401a and 501a onto which floppy disks (not illustrated) are loaded, and CD-ROM drives 301b, 401b and 501b onto which CD-ROMs 700 are loaded, respectively. Inside those main frames 301, 401 and 501, there are incorporated floppy disk drivers for driving the floppy disks loaded from the floppy disk drives 301a, 401a and 501a, and CD-ROM drivers for driving the CD-ROMs 700 loaded from the CD-ROM drives 301b, 401b and 501b.

Figure 3:
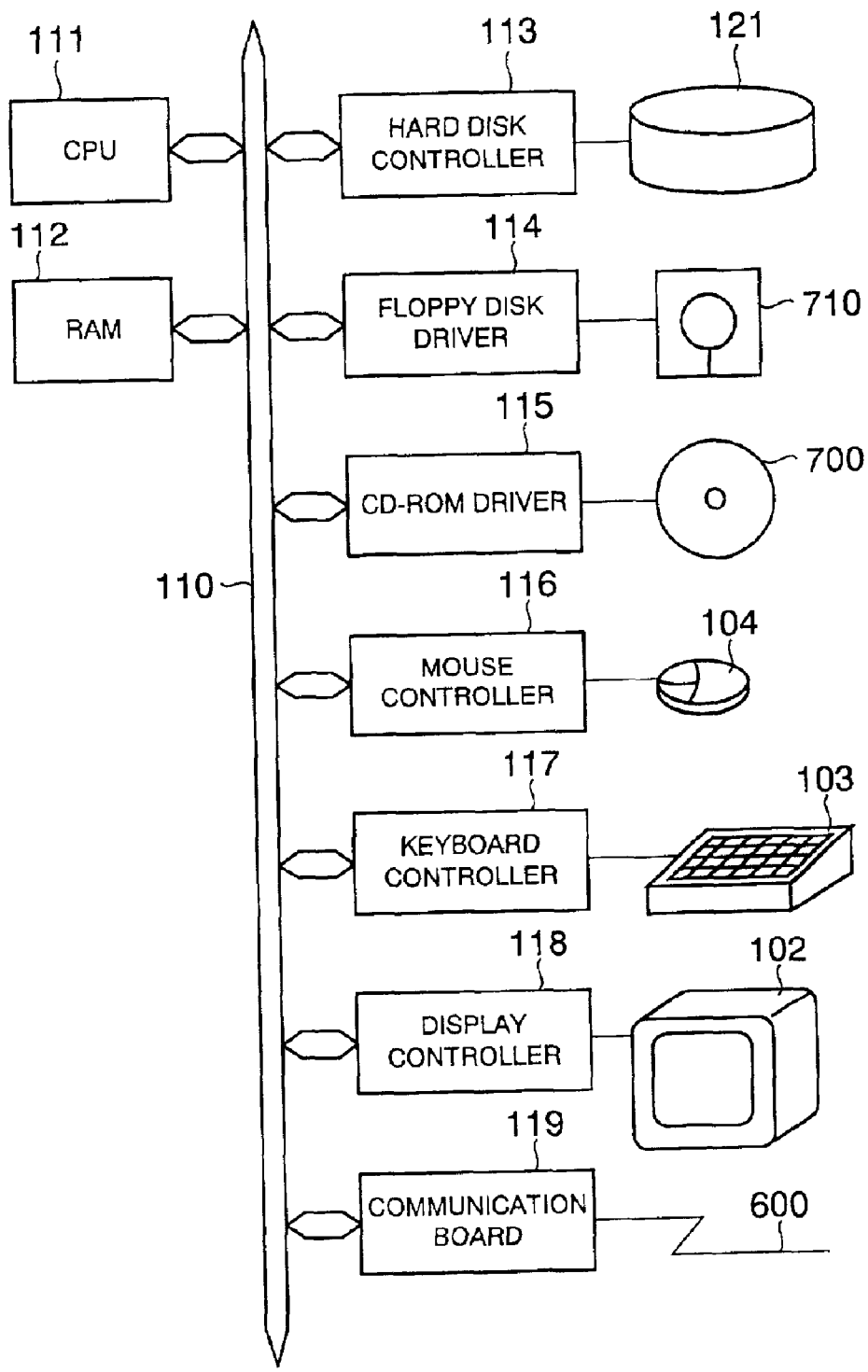
FIG. 3 is a hardware structural view of the computer system having an outside appearance shown in FIG. 2.

FIG. 3 is a hardware structural view of the computer system having an outside appearance shown in FIG. 2.

The computer system shown in FIG. 3 comprises a CPU 111, a RAM 112, a hard disk controller 113, a floppy disk driver 114, a CD-ROM driver 115, a mouse controller 116, a keyboard controller 117, a display controller 118, and a communication board 119. Those elements are connected to each other via a bus 110.

As described referring to FIG. 2, the floppy disk driver 114 and the CD-ROM driver 115, onto which the floppy disk 710 and the CD-ROM 700 are loaded, respectively, are to drive the floppy disk 710 and the CD-ROM 700, respectively.

The communication board 119 is connected to the LAN 600.

The computer system shown in FIG. 3 further comprises a hard disk 121 accessed by the hard disk controller 113, a mouse 104 controlled by the mouse controller 116, a keyboard 103 controlled by the keyboard controller 117, and a CRT display 102 controlled by the display controller 118.

The contents retrieval system of the present embodiment is formed on the computer system 1 shown in FIGS. 1 and 2. It is noted, however, that the contents retrieval system of the present embodiment is not restricted to the structure shown in FIGS. 1 and 2. It is acceptable that the contents retrieval system of the present embodiment is constructed in form of a scalable system which may be formed on any machine.

Next, there will be explained the structure and operation of the contents retrieval system of the present embodiment, referring to screens, tables and flowcharts.

Figure 4:
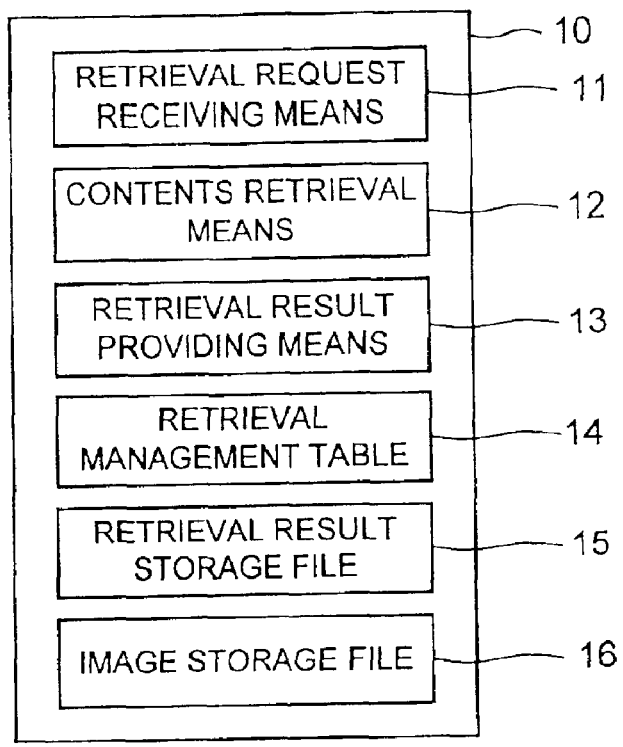
FIG. 4 is a schematic constitution view of a contents retrieval system of the present embodiment.

FIG. 4 is a schematic constitution view of a contents retrieval system of the present embodiment.

As shown in FIG. 4, a contents retrieval system 10 comprises retrieval request receiving means 11, contents retrieval means 12, retrieval result providing means 13, a retrieval management table 14, a retrieval result storage file 15, and an image storage file 16.

The retrieval request receiving means 11 receives a retrieval request of contents on a communication network from a user accessing through the communication network, and sets up processing conditions for retrieval processing in accordance with the retrieval request, and further issues a reservation number of the retrieval processing and inform the user of the reservation number, and in addition applies the reservation number to the processing conditions and registers the same with the retrieval management table 14.

The contents retrieval means 12 retrieves the contents on the communication network in accordance with the processing conditions registered with the retrieval management table 14 and stores the retrieval result, together with the reservation number, in the retrieval result storage file 15.

The retrieval result providing means 13 retrieves a retrieval result associated with the reservation number from among the retrieval results stored in the retrieval result storage file 15, when an inquiry concerning the retrieval result is made from a user based on the reservation number, and provides the retrieval result for the user.

Incidentally, according to the present embodiment, the contents retrieval system is so arranged that the retrieval request receiving means 11 sets up as to whether there is a need to display a retrieval result as one of the processing conditions in form of a thumb-nail image, so that the set up result is registered with the retrieval management table 14, and the contents retrieval means 12 creates the thumb-nail image and stores the thumb-nail image in the image storage file 16 in the event that the thumb-nail image is needed in accordance with the set up result as to whether there is a need to display the thumb-nail image registered with the retrieval management table 14.

Further, according to the present embodiment, the contents retrieval system is so arranged that the retrieval request receiving means 11 sets up as to whether there is a need to inform the user by an electronic mail of the fact that a retrieval result is obtained at the time point when the retrieval result as one of the processing conditions is obtained by the contents retrieval means 12, so that the set up result is registered with the retrieval management table 14, and the contents retrieval means 12 informs the user by an electronic mail of the fact that the retrieval result is obtained in the event that the thumb-nail image is needed in accordance with the set up result as to whether there is a need to inform the user by the electronic mail registered with the retrieval management table 14.

According to the present embodiment, the retrieval management table 14 is formed inside the first server machine 100, and the retrieval result storage file 15 and the image storage file 16 are formed inside the memory unit 200'. However, it is not restricted to the above-mentioned arrangement. It is acceptable that those tables and files are formed on any server machine.

Figure 5:
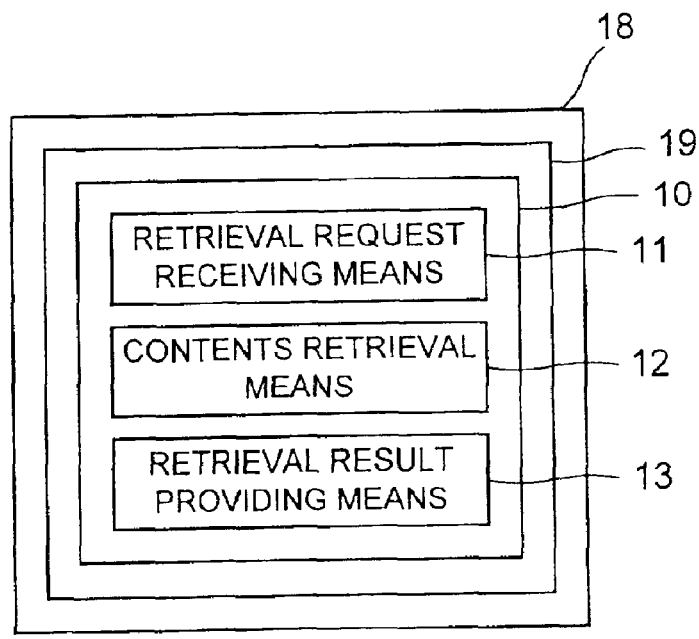
FIG. 5 is a schematic constitution view of a contents retrieval program storage medium of the present embodiment.

FIG. 5 is a schematic constitution view of a contents retrieval program storage medium of the present embodiment.

As shown in FIG. 5, a contents retrieval program storage medium 18 stores a contents retrieval program 19 which forms on the computer system shown in FIG. 1 a contents retrieval system 10 comprising retrieval request receiving means 11, contents retrieval means 12, and retrieval result providing means 13.

The retrieval request receiving means 11, the contents retrieval means 12, and the retrieval result providing means 13, which constitute the contents retrieval system 10, are the same as ones explained referring to FIG. 4.

The contents retrieval program storage media 18 storing the contents retrieval programs 19 are loaded onto the CD-ROM drives 101b and 201b (cf. FIG. 2) of the server machines 100 and 200 (cf. FIG. 2), respectively, so that the contents retrieval programs 19 are read into the server machines 100 and 200 to be installed in their memory units, respectively. Thus, the contents retrieval system 10 is constructed on the respective server machine and be used.

A sort of storage medium for use in the contents retrieval program storage media 18 is not restricted to a particular one. Any one is acceptable, as the storage medium for use in the contents retrieval program storage media 18, which can store the contents retrieval program 19. It is possible to use a desired storage media, for example, a CD-ROM, a CD-R/RW, an MO (Magneto-Optical disk), and a floppy disk.

Hereinafter, there will be described a contents retrieval system of the present embodiment in a case where it is applied to a system for making a specialty of retrieving image contents.

Figure 6:
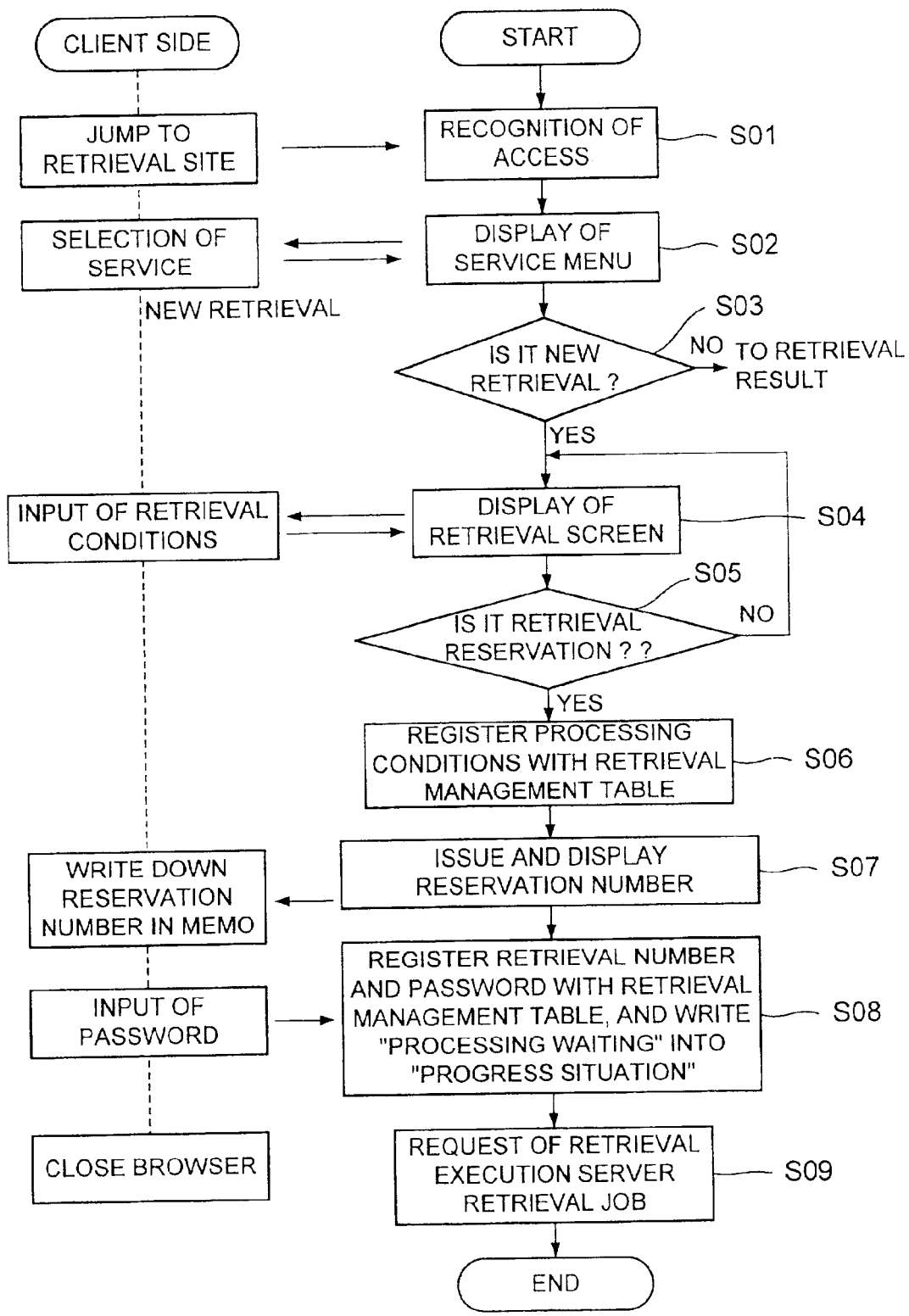
FIG. 6 is a flowchart useful for understanding a retrieval request in a contents retrieval system of the present embodiment.

FIG. 6 is a flowchart useful for understanding a retrieval request in a contents retrieval system of the present embodiment.

As shown in FIG. 6, when a jump is made from the client machines 800a, 800b, 800c, ... (cf. FIG. 1) to the retrieval site, the management server 100 (cf. FIG. 1) of the contents retrieval system 1 recognizes an access from the client (a step S01), so that a service menu screen is displayed on the display unit of the client machine (a step S02).

Figure 7:
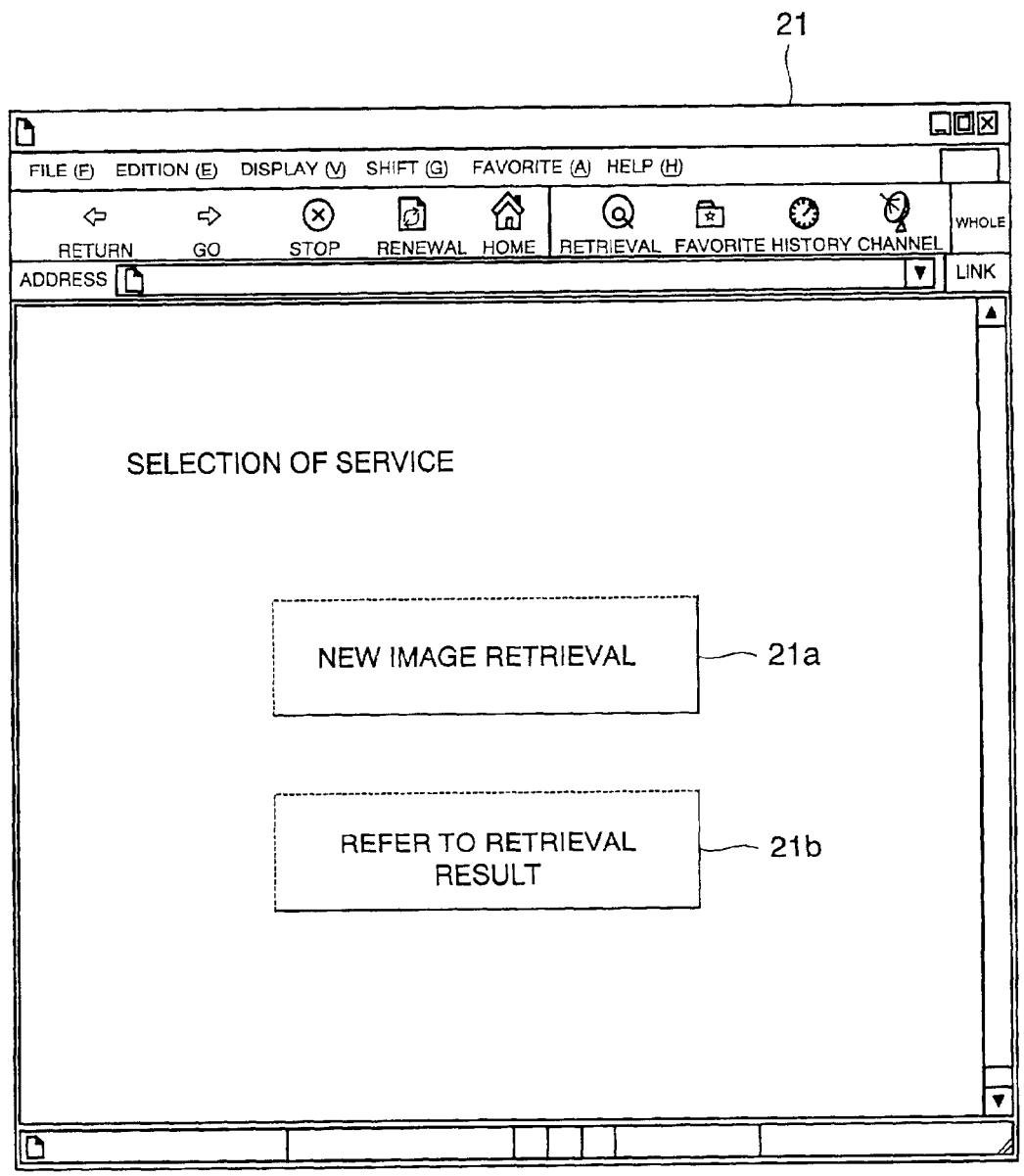
FIG. 7 is a view showing a service menu screen in a contents retrieval system of the present embodiment.

FIG. 7 is a view showing a service menu screen in a contents retrieval system of the present embodiment.

As shown in FIG. 7, a service menu screen 21 is provided with a "new image retrieval" selection button 21a and a "refer to a retrieval result" selection button 21b.

In the event that in the client side a selection of a service is performed, and the "new image retrieval" selection button 21a is depressed (a step S03), the process goes to a step S04 in which a retrieval screen is displayed. In the event that in the client side the "refer to a retrieval result" selection button 21b is depressed, the process goes to a retrieval result referring to routine (which will be described latter).

In a step S04, a retrieval screen is displayed on the display unit of the client machine.

Figure 8:
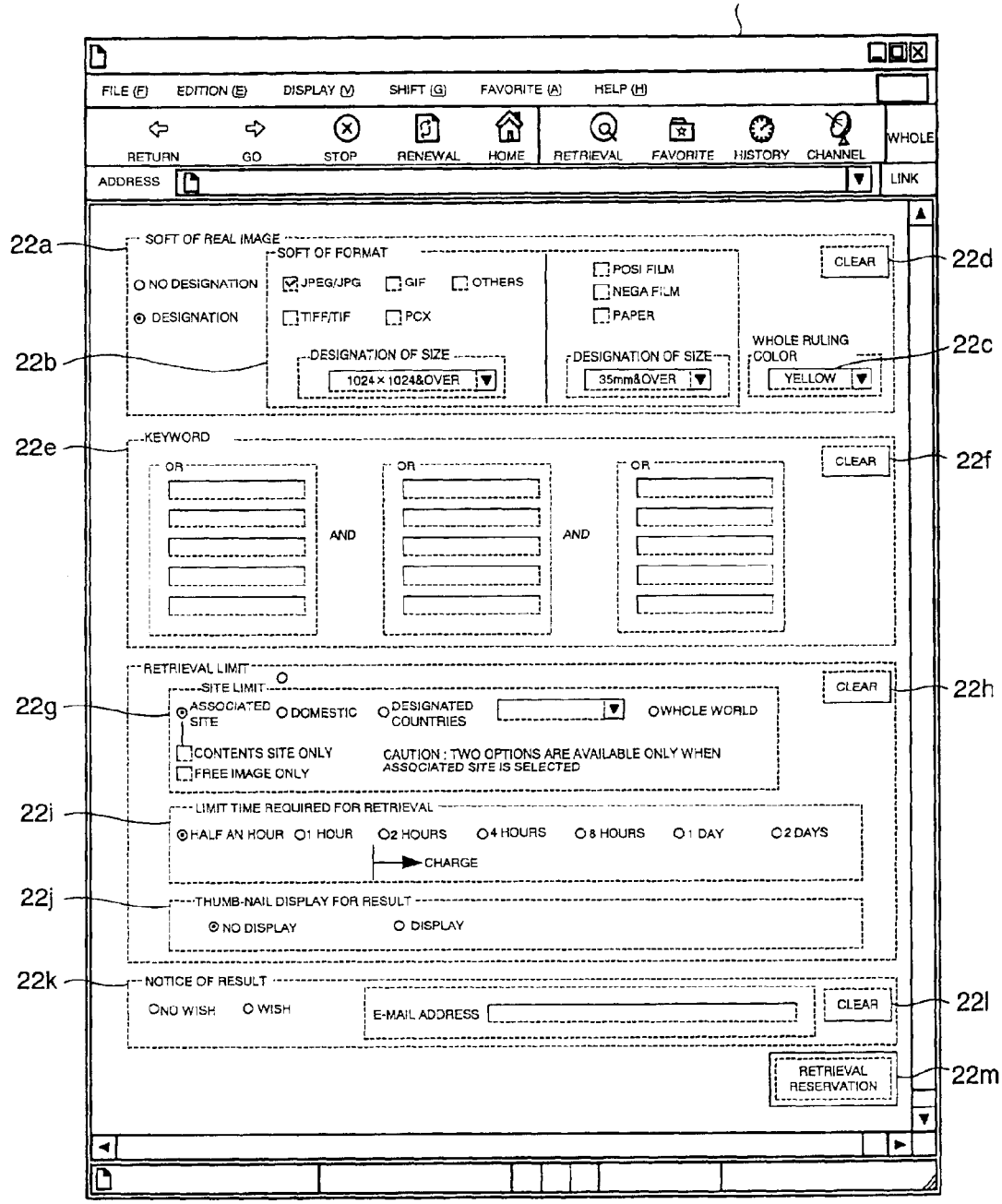
FIG. 8 is a view showing a retrieval screen in a contents retrieval system of the present embodiment.

FIG. 8 is a view showing a retrieval screen in a contents retrieval system of the present embodiment.

As shown in FIG. 8, a retrieval screen 22 is provided with a real image sort set up column 22a, a format sort set up column 22b, a ruling color setting set up column 22c, a first clear button 22d, a keyword set up column 22e, a second clear button 22f, a retrieval limit set up column 22g, a third clear button 22h, a retrieval limit time set up column 22i, a thumb-nail display set up column 22j, a result notice condition set up column 22k, a fourth clear button 22l related to the result notice condition set up, and a retrieval reservation button 22m.

The real image sort set up column 22a is for setting up as to whether a designation for a sort of a real image is performed.

The format sort set up column 22b is for setting up as to whether a sort of format is JPEG/JPG, TIFF/TIF, GIF, PCX, or others, how a designation of a size is determined, and what is selected from among Posi Film, Nega Film, Paper.

The ruling color setting set up column 22c is for setting up the entire ruling color.

The first clear button 22d is for resetting a set up of the sort designation for the real image.

The keyword set up column 22e is for setting up a keyword for retrieval. AND and OR are used to set up in detail a keyword for an image retrieval.

The second clear button 22f is for resetting a set up of the keyword.

The retrieval limit set up column 22g is for setting up a limit of a site to be retrieved, and is able to set up as to such a matter that a limit of a site to be retrieved is restricted to the associated site, the internal site, the designated countries, or the whole world, or alternatively contents site only or free image only.

The third clear button 22h is for resetting a set up of a limit of the retrieval.

The retrieval limit time set up column 22i is for setting up a limit time required for retrieval to for example, the half hour, one hour, two hours, four hours, or more.

The thumb-nail display set up column 22j is for setting up as to whether there is a need to create a thumb-nail image from the retrieved image and display the created thumb-nail image.

a result notice condition set up column 22k is for setting up as to whether a user wishes a service for informing the user of it when a retrieval result is obtained.

The fourth clear button 22l is for resetting a set up of a result notice condition.

The retrieval reservation button 22m is for making a reservation for retrieval on a retrieval condition set up on the retrieval screen 22 by a user.

A user depresses the retrieval reservation button 22m when retrieval conditions are set up on the respective set up columns using the retrieval screen 22, and it is decided that the retrieval reservation is made on the set up retrieval conditions.

The retrieval request receiving means 11 (cf. FIG. 4) monitors whether a user depresses the retrieval reservation button 22m (a step S05). In the event that the retrieval reservation button 22m is depressed, the process goes to a step S06. In the event that the retrieval reservation button 22m is not depressed, the process returns to the step S04 in which a display of the retrieval screen 22 is continued.

Figure 9:
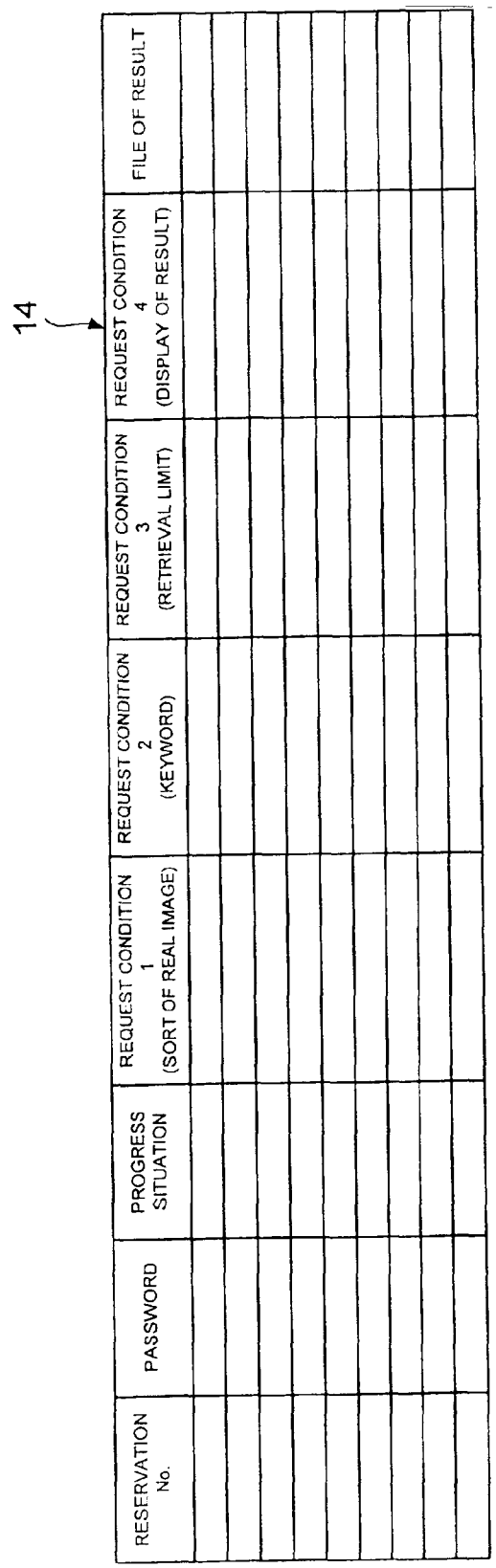
FIG. 9 is a view showing contents of a retrieval management table in a contents retrieval system of the present embodiment.

In the step S06, the processing conditions, which comprises a retrieval condition set up by a user, a thumb-nail display condition and a result notice condition, are registered with a retrieval management table 14 shown in FIG. 9.

FIG. 9 is a view showing contents of a retrieval management table in a contents retrieval system of the present embodiment.

As shown in FIG. 9, the retrieval management table 14 is provided with a "reservation number", a "password", a "progress situation", a "request condition 1 (a sort of a real image)", a "request condition 2 (a keyword)", a "request condition 3 (a retrieval limit)", a "request condition 4 (a display of a result)", and a "file of a result.

The retrieval request receiving means 11 registers the contents of the processing conditions set up on the retrieval screen 22 with the respective items from the "request condition 1 (a sort of a real image)" to the "request condition 4 (a display of a result)" of the retrieval management table 14 (a step S06).

Figure 10:
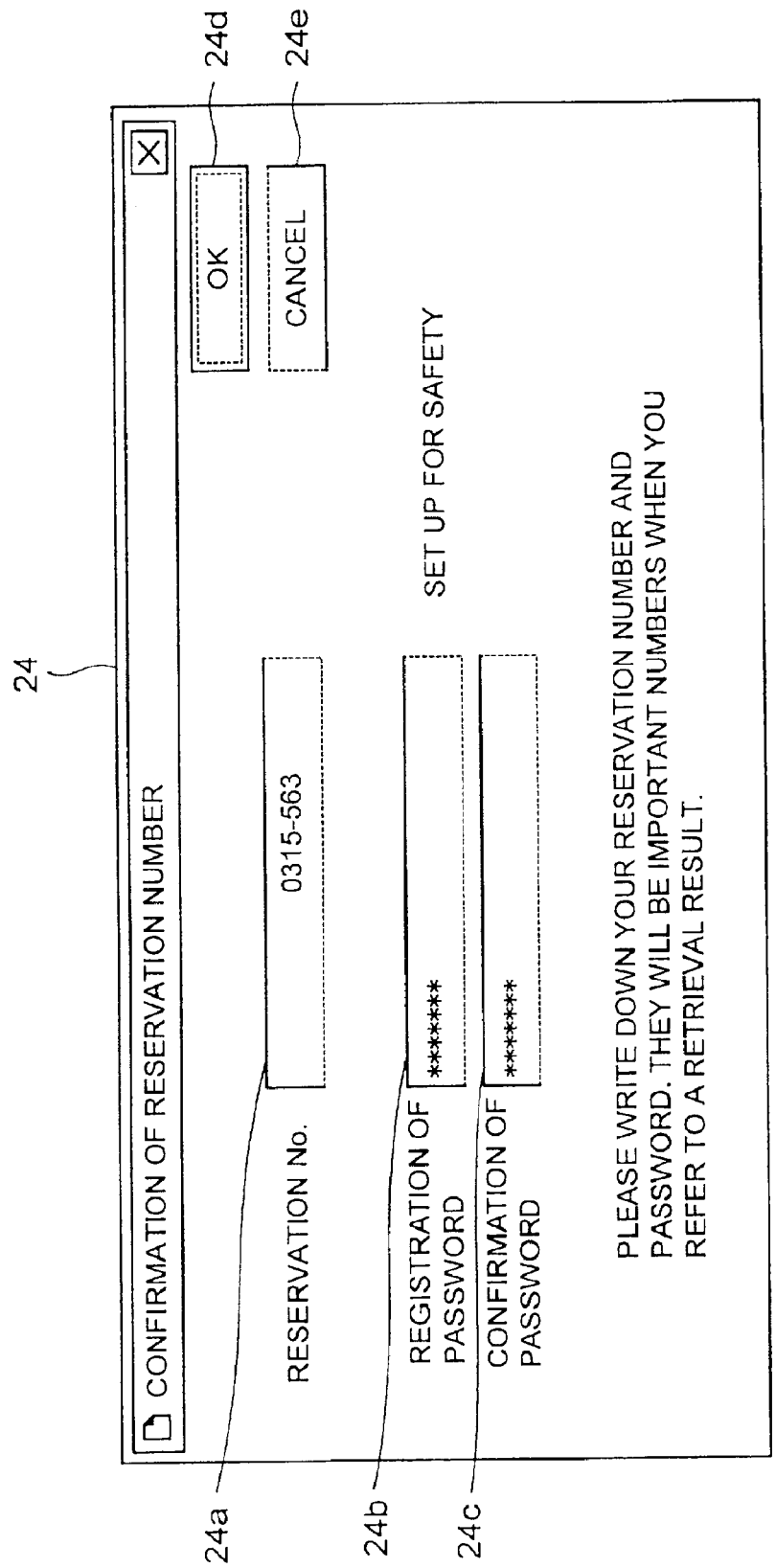
FIG. 10 is a view showing a reservation number display screen.

Next, the retrieval request receiving means 11 issues a reservation number for the retrieval processing, and displays it on a reservation number display screen shown in FIG. 10 (a step S07).

FIG. 10 is a view showing a reservation number display screen.

As shown in FIG. 10, a reservation number display screen 24 is provided with a reservation number display column 24a, a password registration column 24b, a password confirmation column 24c, an OK button 24d, and a cancel button 25e.

When a user depresses the OK button 24d after the user writes down the reservation number displayed on the reservation number display column 24a of the reservation number display screen 24 and inputs one's own password into the password registration column 24b, and then confirms the password displayed on the password confirmation column 24c, the retrieval request receiving means 11 (cf. FIG. 4) registers the reservation number and the password entered by the user with the retrieval management table 14 (cf. FIG. 9), and further writes a "processing waiting" into the "progress situation" of the retrieval management table 14 (a step S08).

Next, the retrieval request receiving means 11 requests of the second server machine (a retrieval execution server) 200 (cf. FIG. 1) a retrieval job based on the retrieval request (a step S09).

Next, there will be explained retrieval processing by the contents retrieval means (cf. FIG. 4).

Figure 11:
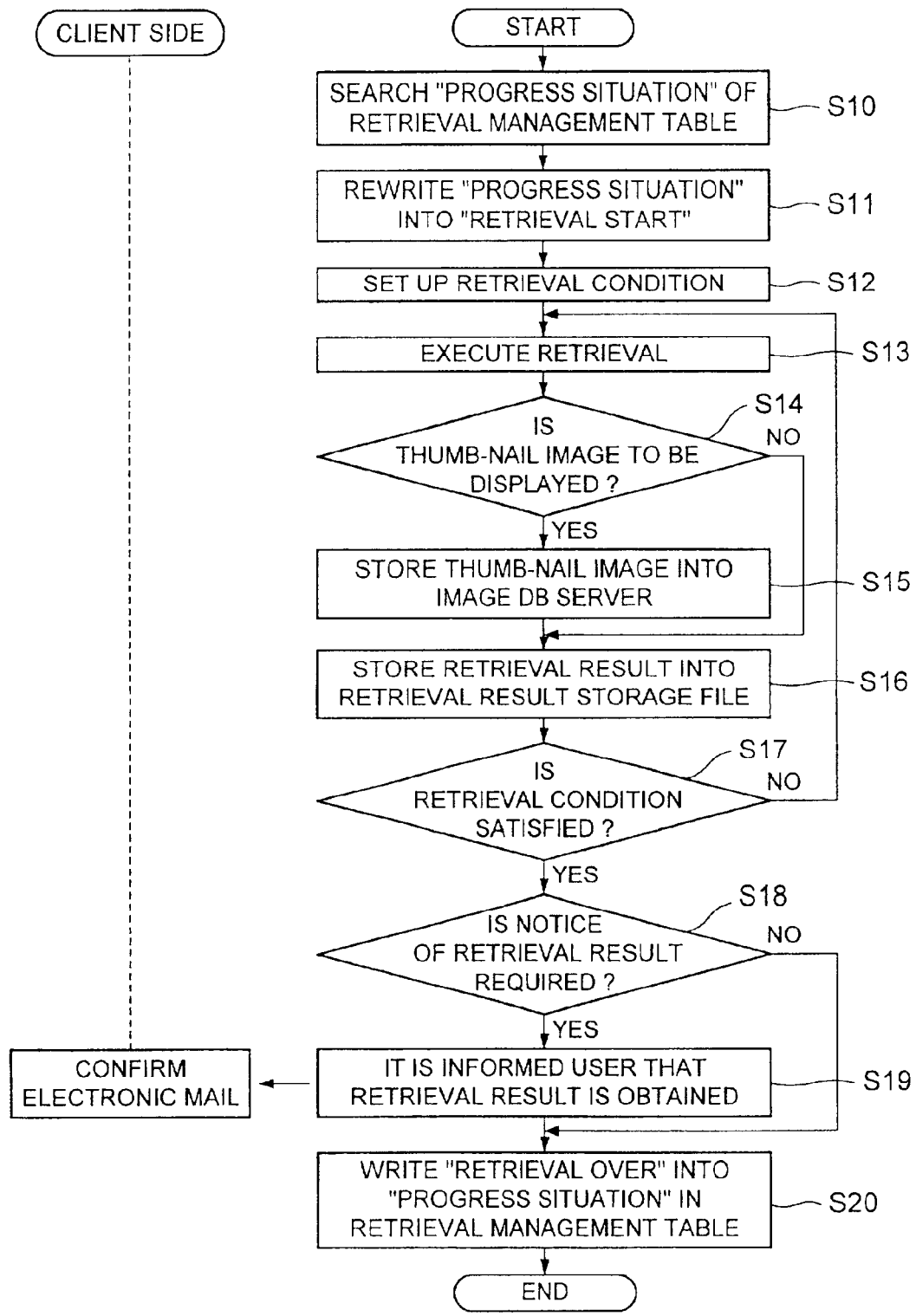
FIG. 11 is a flowchart useful for understanding retrieval processing in a contents retrieval system of the present embodiment.

FIG. 11 is a flowchart useful for understanding retrieval processing in a contents retrieval system of the present embodiment.

According to the contents retrieval system of the present embodiment, the retrieval processing for the contents on the communication network is executed by the contents retrieval means formed on the second server machine (the retrieval execution server) 200. The second server machine (the retrieval execution server) 200 is constructed in form of a so-called multi-threading system, and thus it is possible to simultaneously deal with retrieval requests from a plurality of clients.

The second server machine (the retrieval execution server) 200, as shown in FIG. 11, searches the "progress situation" of the retrieval management table 14 (cf. FIG. 9) to retrieves as to whether there is a record into which the "processing waiting" is written (a step S10). In the event that the "processing waiting" is detected, the "progress situation" of the record is rewritten into a "retrieval start" (a step S11) and the processing condition of the record, which is recorded on the retrieval management table 14, is read (a step S12) to start the execution of the retrieval processing (a step S13). First, it is determined whether it is set up that there is a need that the thumb-nail image is displayed (a step S14). In the event that it is set up that there is no need that the thumb-nail image is displayed, the process jumps to a step S16.

As a result of the decision in the step S14, in the event that it is set up that there is a need that the thumb-nail image is displayed, the thumb-nail image is created in accordance with the retrieved image information and is stored in the image storage file 16 (cf. FIG. 4) (a step S15).

Next, information as to the retrieval result is stored in the retrieval result storage file 15 (cf. FIG. 4), and it is recorded in the "file of a result" column of the retrieval management table 14 as to where the information as to the retrieval result is recorded in the retrieval result storage file 15 (the step S16).

Figure 12:
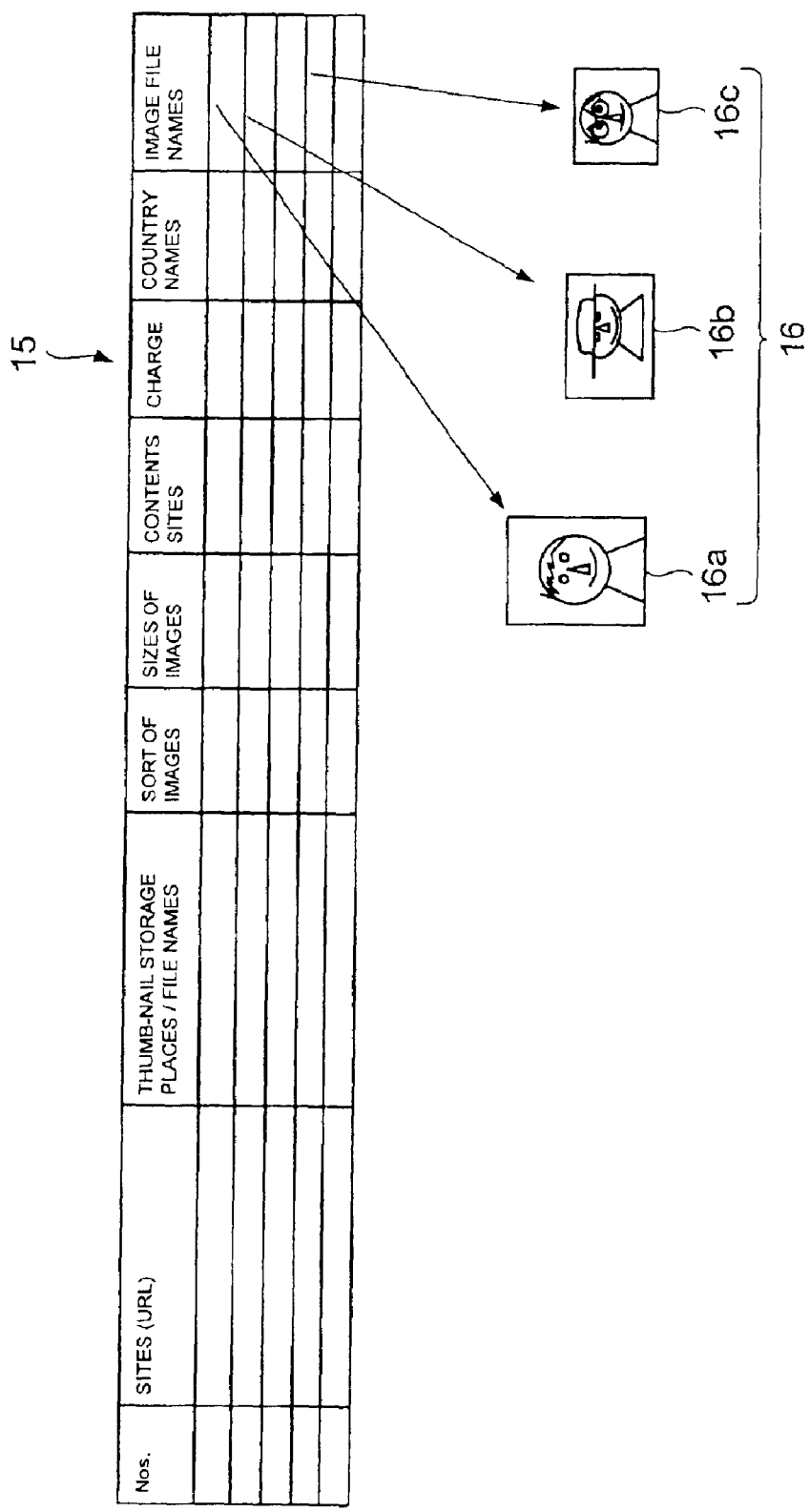
FIG. 12 is a view showing a retrieval result storage file and an image storage file in a contents retrieval system of the present embodiment.

FIG. 12 is a view showing a retrieval result storage file and an image storage file in a contents retrieval system of the present embodiment.

As shown in FIG. 12, the retrieval result storage file 15 is provided with "Nos.", "sites (URL)", "thumb-nail storage places/file names", "sorts of images", "sizes of images", "contents sites", "a charge", "country names", and "image file names" in a case where there are plurality of pieces of image information which fit to the retrieval condition. In the event that it is set up that there is a need that the thumb-nail image is displayed, in the column of the "image file names" there are recorded file names such as image files 16a, 16b, 16c, . . . , which store thumb-nail images created in the step S15.

Incidentally, the retrieval result storage file 15 is created for each of the retrieval request from a user. Thus, there exists a plurality of retrieval result storage files, and there is a possibility that there exists a plurality of image storage files, too.

In a step S17, it is decided as to whether the retrieval condition is satisfied. In the event that the retrieval condition is not yet satisfied, the process returns to the step S13 in which the execution of the retrieval processing is continued.

As a result of the decision in the step S17, in the event that it is decided that the retrieval condition is satisfied, next, as the result notice condition, it is decided as to whether it is set up that a user wishes a notice of a retrieval result to the user (a step S18). In the event that it is set up that a user does not wish a notice of a retrieval result to the user, the process jumps to a step S20.

As a result of the decision in the step S18, in the event that it is set up that a user wishes a notice of a retrieval result to the user, it is informed the user that the retrieval result is obtained (a step S19).

Next, in a step S20, a "retrieval over" is written into the "progress situation" of the associated record in the retrieval management table 14 (cf. FIG. 9) (the step S08), and the contents retrieval means terminates the retrieval processing.

Next, there will be explained the retrieval processing by the retrieval result providing means (cf. FIG. 4).

Figure 13:
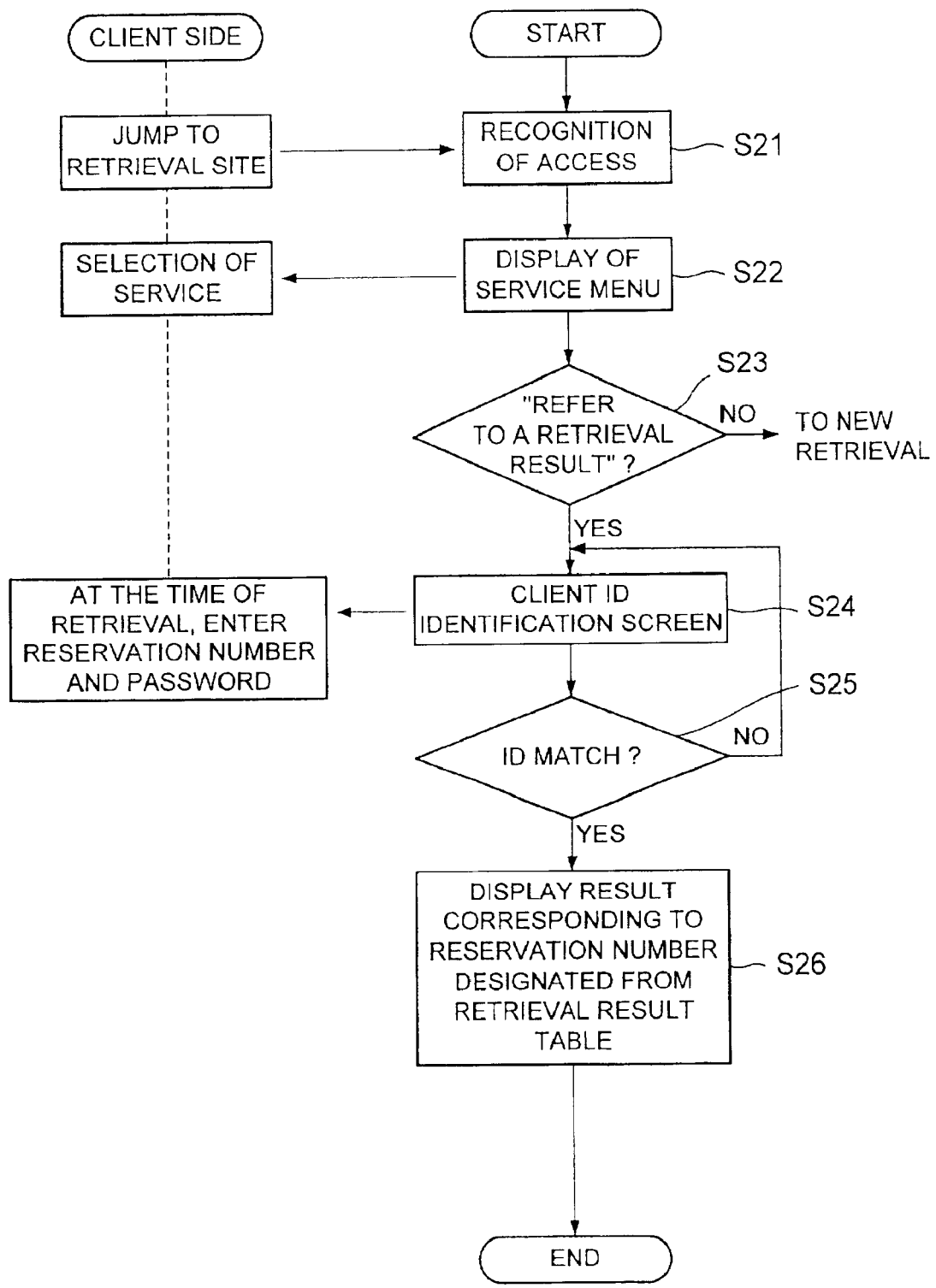
FIG. 13 is a flowchart useful for understanding a retrieval result providing processing in a contents retrieval system of the present embodiment.

FIG. 13 is a flowchart useful for understanding a retrieval result providing processing in a contents retrieval system of the present embodiment.

According to the contents retrieval system of the present embodiment, the retrieval result providing means is formed on the first server machine (the retrieval execution server) 100.

In the event that a user, who makes a retrieval request for the contents retrieval system, receives a message that the retrieval result is obtained from the server side, or in the event that a retrieval limit time, which is set up when the user makes the retrieval request on the retrieval screen (cf. FIG. 8), elapses, for example, in the event that more than two hours elapses since the retrieval limit time is set up to two hours, a jump to the retrieval site is made. Upon receipt of it, the retrieval site recognizes the access (a step S21), and displays a service menu screen (cf. FIG. 7) on the display unit of the client machine (a step S22).

In the event that a selection of a service is made at the client side, and a "refer to a retrieval result" selection button 21b is depressed, the process goes to a step S24 in which a display of a client ID identification screen is performed. In the event that the "new image retrieval" selection button 21a is depressed at the client side, the process goes to a display of the retrieval screen (after the step S04 in FIG. 6).

In the step S24, the client ID identification screen is displayed on the display unit of the client machine.

Figure 14:
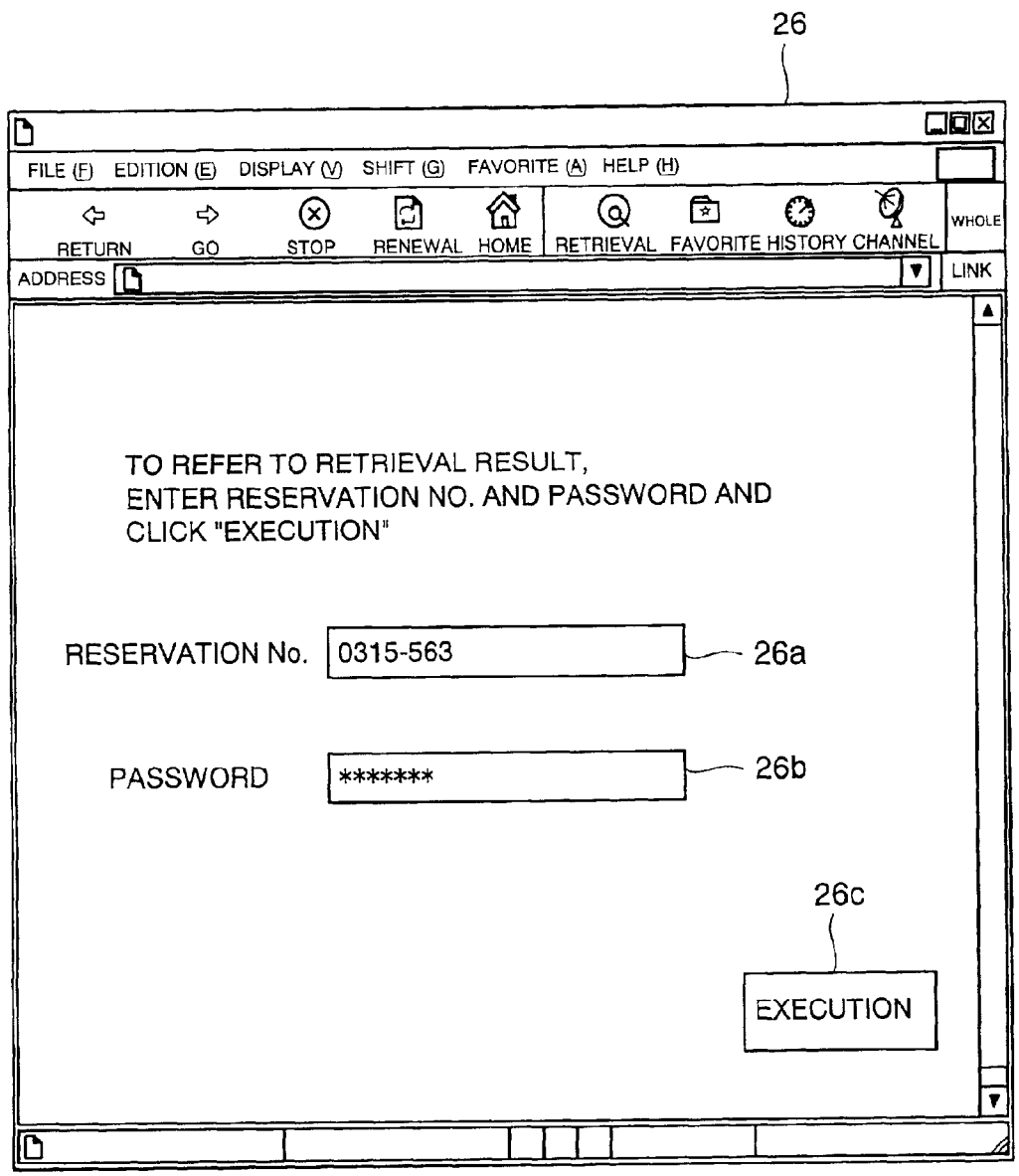
FIG. 14 is a view showing a retriever ID identification screen in a contents retrieval system of the present embodiment.

FIG. 14 is a view showing a retriever ID identification screen in a contents retrieval system of the present embodiment.

As shown in FIG. 14, a client ID identification screen 26 is provided with a reservation number input column 26a, a password-input column 26b and an execution button 26c.

When a user enters a reservation number and a password to the reservation number input column 26a and the password-input column 26b of the client ID identification screen 26, respectively, and depresses the execution button 26c, the retrieval result providing means 13 (cf. FIG. 4) compares the entered password with a password of record of the reservation number registered with the retrieval management table 14 (cf. FIG. 9) (a step S25). In the event that both the passwords are coincident with one another, the process goes to a step 26. In the event that both the passwords are not coincident with one another, the process returns to the step 24 to encourage the user to enter again the reservation number and the password.

Figure 15:
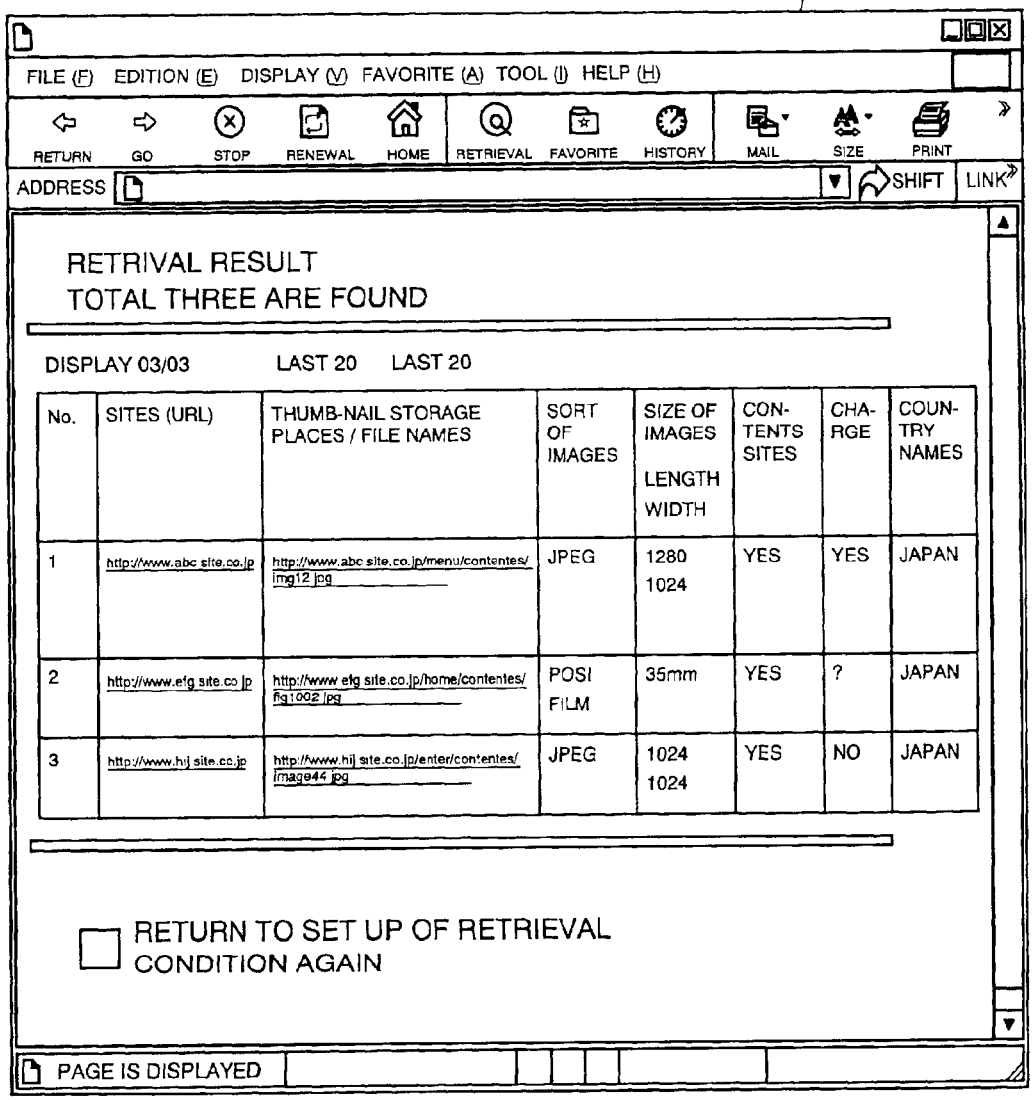
FIG. 15 is a view showing a retrieval result screen in a contents retrieval system of the present embodiment.

In the step 26, image information associated with the reservation number is read from the retrieval result storage file 15 (cf. FIGS. 4 and 12), and displays the same on a retrieval result screen shown in FIG. 15.

FIG. 15 is a view showing a retrieval result screen in a contents retrieval system of the present embodiment.

As shown in FIG. 15, on a retrieval result screen 27, first, there is displayed the number of retrievals such as "a retrieval result: total three are found", and below there are displayed "Nos.", "sites (URL)", "thumb-nail storage places/file names", "sorts of images", "sizes of images", "contents sites", "a charge", and "country names" on each of the three.

Figure 16:
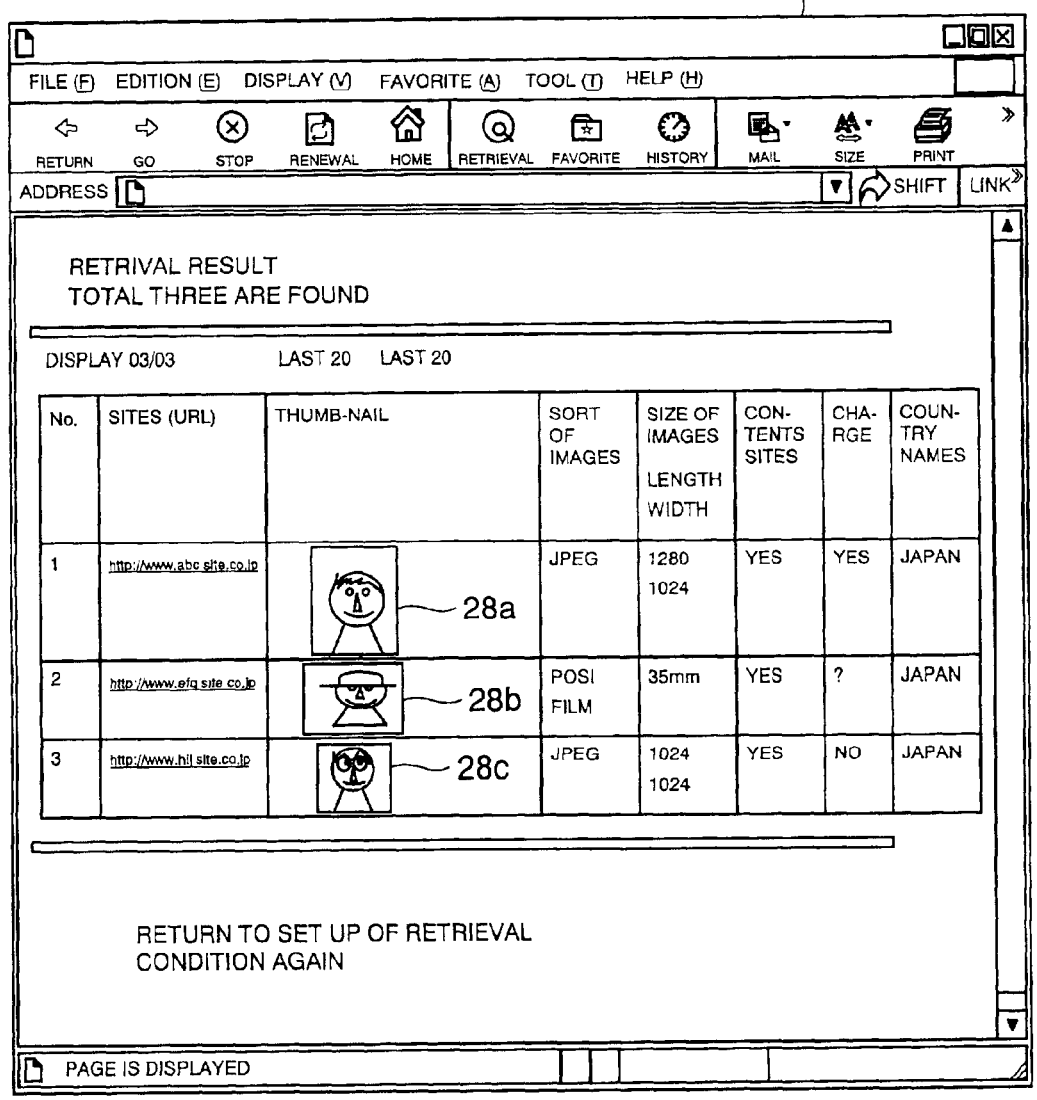
FIG. 16 is a view showing a retrieval result screen when it is set up that there is a need to display a thumb-nail image.

FIG. 16 is a view showing a retrieval result screen when it is set up that there is a need to display a thumb-nail image.

As shown in FIG. 16, on a retrieval result screen 28, there are displayed images 28a, 28b, 28c, . . . per se of the "thumb-nail" instead of the "thumb-nail storage places/file names".

In this manner, the retrieval result providing means 13 (cf. FIG. 4) provides a retrieval result for a user. This makes it possible to meet the retrieval request that the retrieval request receiving means 11 receives from the user.

As mentioned above, according to the present invention, there is provided a contents retrieval system comprising: retrieval request receiving means for receiving a retrieval request of contents on a communication network from a user accessing through the communication network, and setting up processing conditions for retrieval processing in accordance with the retrieval request, and further issuing a reservation number of the retrieval processing and informing the user of the reservation number, and in addition applying the reservation number to the processing conditions and registering the same with a predetermined retrieval management table; contents retrieval means for retrieving the contents on the communication network in accordance with the processing conditions registered with said retrieval management table and storing the retrieval result, together with the reservation number, in a predetermined retrieval result storage file; and retrieval result providing means for retrieving a retrieval result associated with the reservation number from among the retrieval results stored in said retrieval result storage file, when an inquiry concerning the retrieval result is made from a user based on the reservation number, and providing the retrieval result for the user. This feature makes it possible to implement a contents retrieval system capable of performing in low cost a retrieval of contents even in case of a contents retrieval requiring a long time.

Further, according to the contents retrieval program storage medium of the present invention, it is possible to readily form the contents retrieval system on a computer.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A contents retrieval computer-implemented system comprising:

retrieval request receiving means for receiving a retrieval request of contents on a communication network from a user accessing through the communication network, and setting up processing conditions for retrieval processing in accordance with the retrieval request, and further issuing a reservation number of the retrieval processing and informing the user of the reservation number, and in addition applying the reservation number to the processing conditions and registering the same with a predetermined retrieval management table;

contents retrieval means for retrieving the contents on the communication network in accordance with the processing conditions registered with said retrieval management table and storing the retrieval result, together with the reservation number, in a predetermined retrieval result storage file; and retrieval result providing means for retrieving a retrieval result associated with the reservation number from among the retrieval results stored in said retrieval result storage file, when an inquiry concerning the retrieval result is made from a user based on the reservation number, and providing the retrieval result for the user.

2. A contents retrieval system according to claim 1, wherein said retrieval request receiving means sets up as to whether there is a need to display a retrieval result as one of the processing conditions in form of a thumb-nail image, so that the set up result is registered with said retrieval management table, and said contents retrieval means creates the thumb-nail image and stores the thumb-nail image in a predetermined image storage file in the event that the thumb-nail image is needed in accordance with the set up result as to whether there is a need to display the thumb-nail image registered with said retrieval management table.

3. A contents retrieval system according to claim 1, wherein said retrieval request receiving means sets up as to whether there is a need to inform a user by an electronic mail of the fact that a retrieval result is obtained at the time point when the retrieval result as one of the processing conditions is obtained by said contents retrieval means, so that the set up result is registered with said retrieval management table, and said contents retrieval means informs the user by an electronic mail of the fact that the retrieval result is obtained in the event that the thumb-nail image is needed in accordance with the set up result as to whether there is a need to inform the user by the electronic mail registered with said retrieval management table.

4. A contents retrieval program storage medium storing a contents retrieval program for forming a contents retrieval system on a computer system, said contents retrieval system comprising:

retrieval request receiving means for receiving a retrieval request of contents on a communication network from a user accessing through the communication network, and setting up processing conditions for retrieval processing in accordance with the retrieval request, and further issuing a reservation number of the retrieval processing and informing the user of the reservation number, and in addition applying the reservation number to the processing conditions and registering the same with a predetermined retrieval management table;

contents retrieval means for retrieving the contents on the communication network in accordance with the processing conditions registered with said retrieval management table and storing the retrieval result, together with the reservation number, in a predetermined retrieval result storage file; and retrieval result providing means for retrieving a retrieval result associated with the reservation number from among the retrieval results stored in said retrieval result storage file, when an inquiry concerning the retrieval result is made from a user based on the reservation number, and providing the retrieval result for the user.

5. A contents retrieval system according to claim 1, wherein a user establishes a connection to the network at a first log on wherein the retrieval request is made and the reservation number is issued; and wherein a user establishes a connection to the network at a second log on wherein the retrieval result providing means provides the retrieval result for the user based on the reservation number.

6. A contents retrieval system according to claim 1, further comprising a service menu, wherein the user is prompted to select between retrieving new information or referring to a past retrieval as the retrieval request.

7. A contents retrieval system according to claim 1, wherein a user is prompted for a password and the reservation number when an inquiry concerning the retrieval result is made.

8. A contents retrieval system according to claim 1, wherein the reservation number is initially registered with the predetermined retrieval management table at the time of the retrieval request.

9. A contents retrieval system according to claim 1, wherein a reservation number is unique to each retrieval request.

10. A contents retrieval system according to claim 1, further comprising:

a display, wherein said display displays said reservation number to the user.

11. A contents retrieval system according to claim 1, further comprising:

a plurality of retrieval result storage files, wherein one of a plurality of retrieval result storage files is created for each retrieval request.

12. A contents retrieval system according to claim 5, wherein the contents retrieval means executes retrieval regardless of state of user network connection to the contents retrieval means.

13. A contents retrieval system according to claim 12, wherein the communication network comprises an internet, and the contents retrieval means executes retrieval even when the user closes an internet browser to the internet.

14. A contents retrieval system according to claim 1, wherein said retrieval request receiving means comprises a server, wherein said server issues said reservation number of the retrieval processing.

15. A contents retrieval program storage medium according to claim 4, wherein said retrieval request receiving means comprises a server, wherein said server issues said reservation number of the retrieval processing.

* * * * *